Aug. 6, 1940.   O. UFEN   2,210,156
POWER DRIVEN HAY GATHERER AND STACKER
Filed Oct. 24, 1939   5 Sheets-Sheet 2
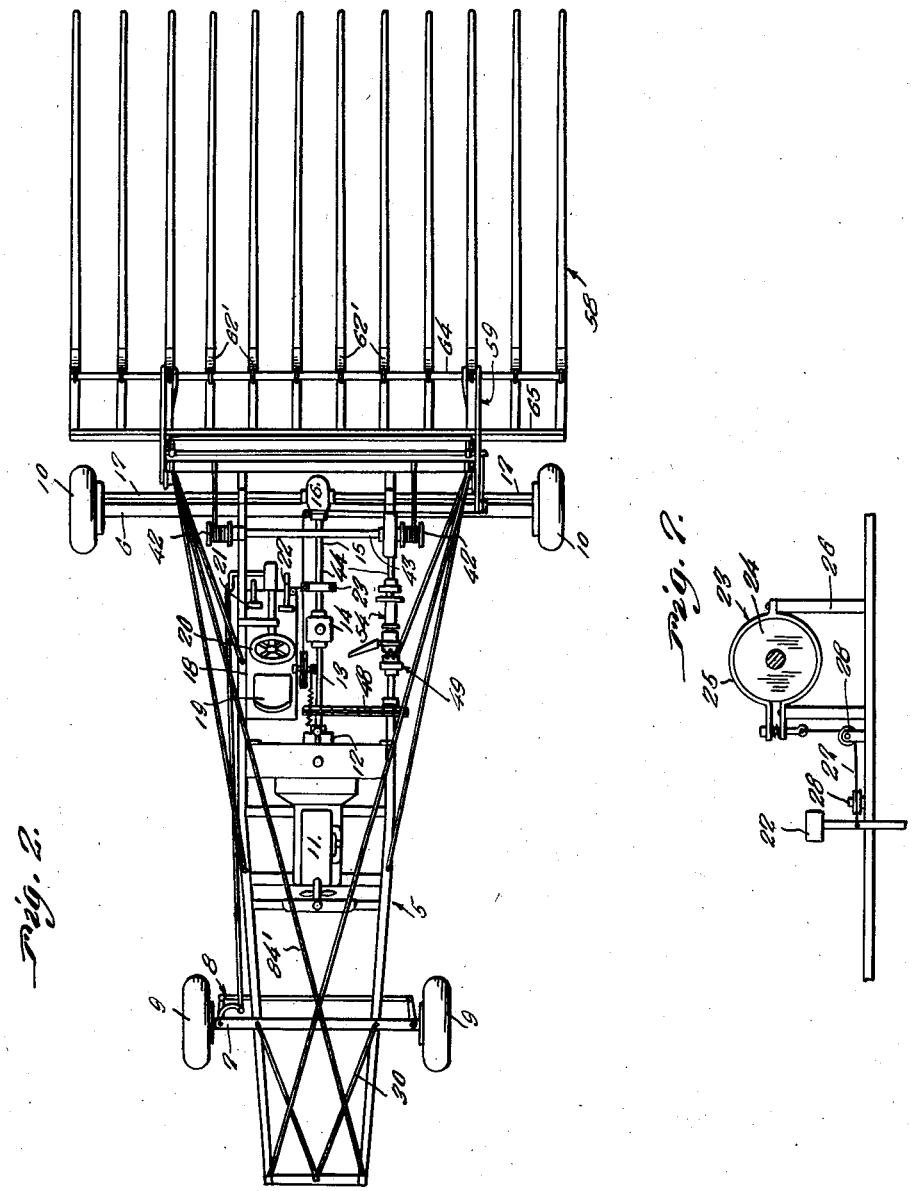
Inventor
*Otto Ufen*
By *Clarence A. O'Brien and Hyman Berman*
Attorneys

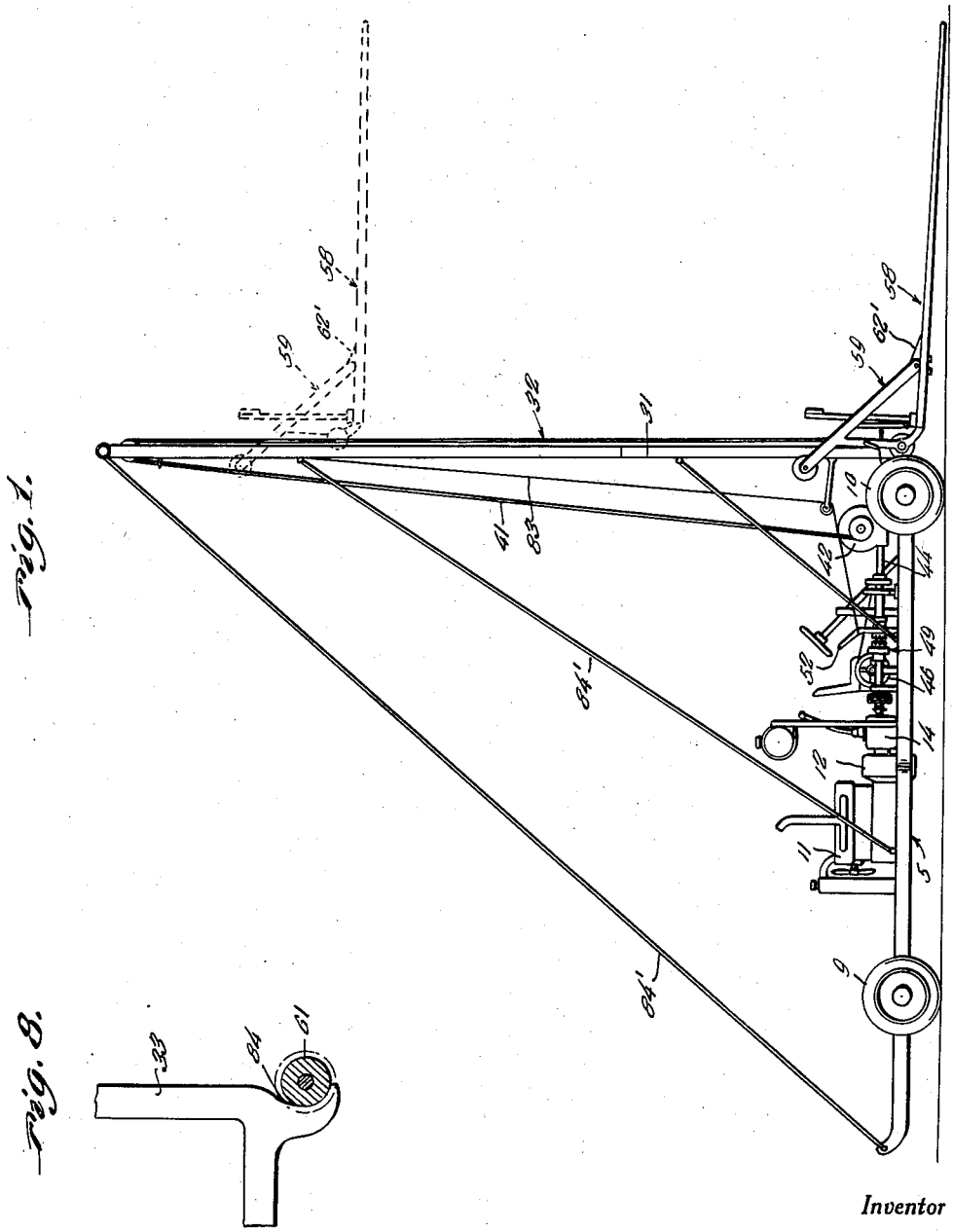

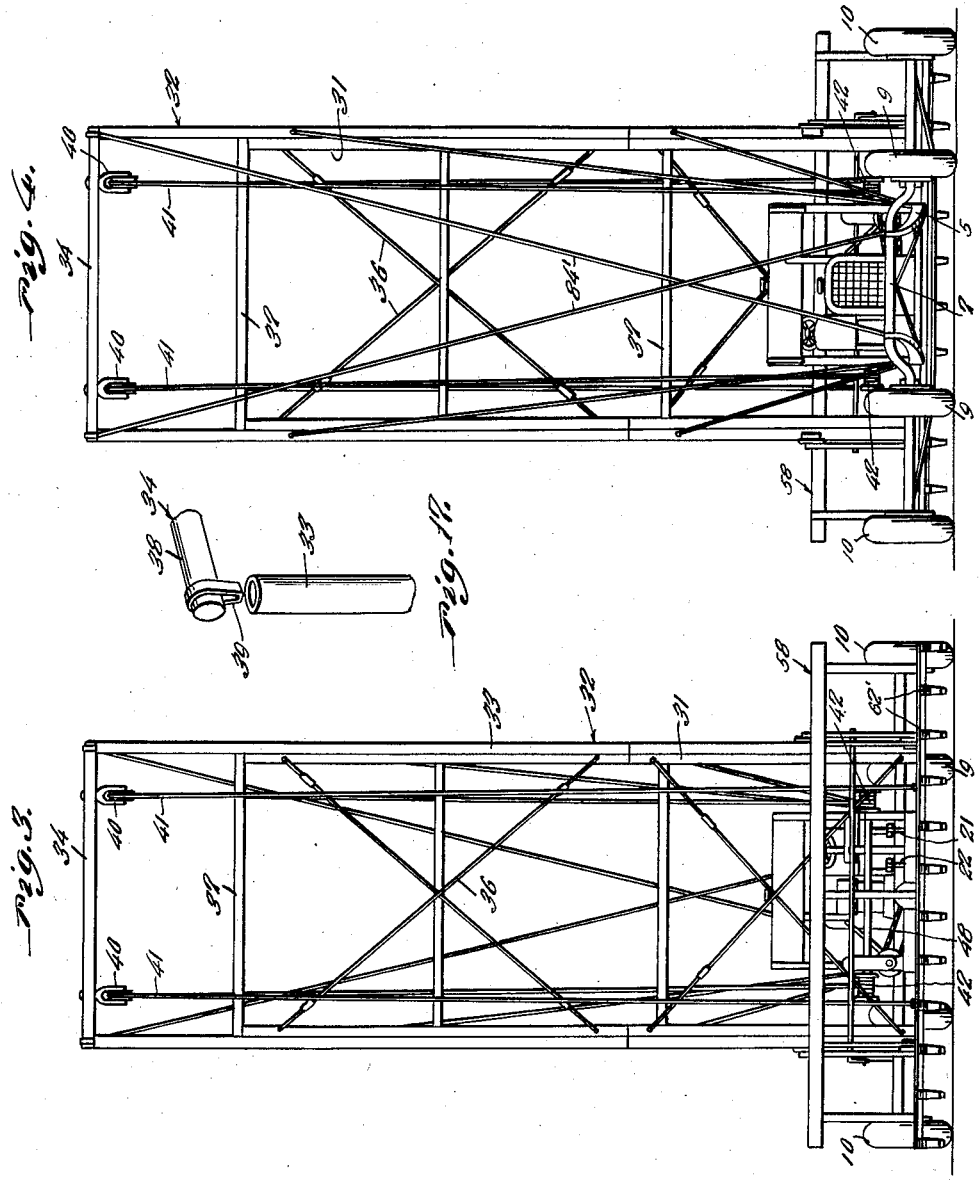

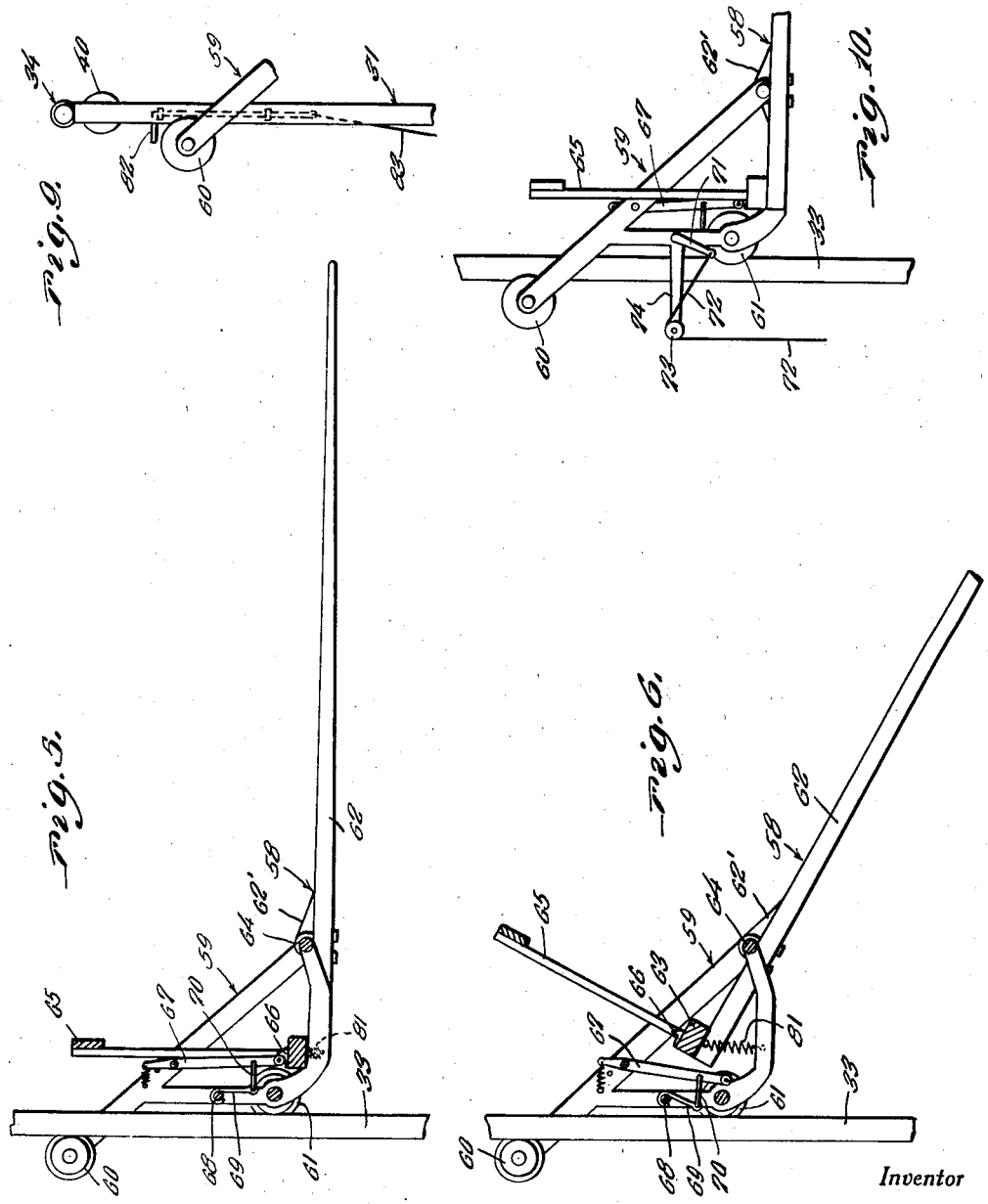

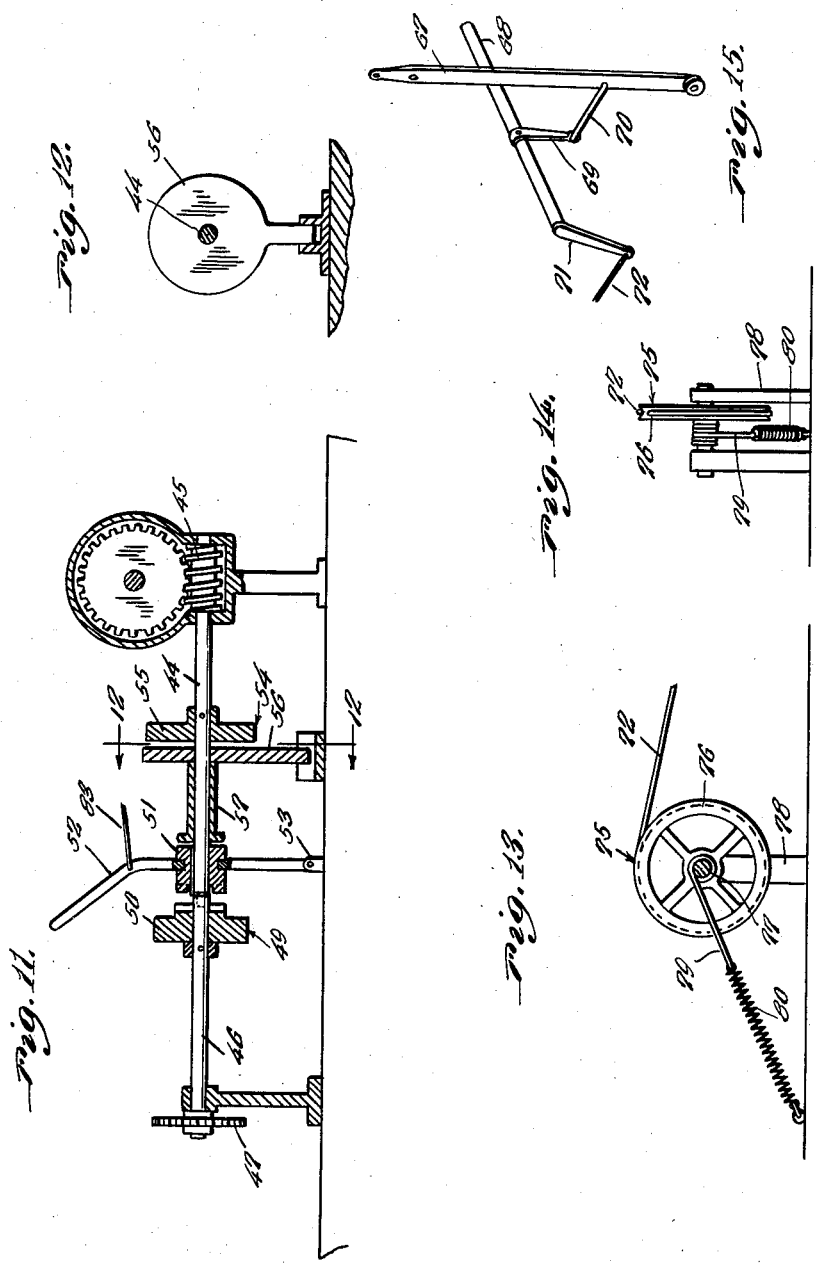

Patented Aug. 6, 1940

2,210,156

UNITED STATES PATENT OFFICE 2,210,156

POWER DRIVEN HAY GATHERER AND STACKER

Otto Ufen, Miller, S. Dak., assignor of one-third to Julius Ufen and one-third to Wallace W. Bohning, Miller, S. Dak.

Application October 24, 1939, Serial No. 301,091

2 Claims. (Cl. 214—113)

This invention relates to a farm implement especially adapted for gathering hay, carrying said gathered hay to a selected place and stacking the hay at the selected place or for delivering the gathered hay onto a wagon or like conveyance.

The primary object of this invention is the provision of a motor propelled vehicle equipped with a frame construction including a vertically arranged track adjustable as to height on which travels a fork driven by power obtained from the power source of the vehicle and under manual control so that hay may be gathered by the fork from the ground and elevated to a selected height and then dumped when desired for stacking the hay or for the loading thereof into a hay wagon.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a power driven hay gatherer and stacker or loading device constructed in accordance with my invention.

Figure 2 is a top plan view illustrating the device.

Figure 3 is a front elevation illustrating the device.

Figure 4 is a rear elevation illustrating the device.

Figure 5 is a fragmentary side elevation partly in section illustrating the fork in load-carrying position.

Figure 6 is a fragmentary side elevation partly in section showing the fork in dumping position.

Figure 7 is a detail view partly in section illustrating a brake mechanism for the device.

Figure 8 is a fragmentary side elevation, partly in section, illustrating the lower end of the track engaged by one of the rollers of the fork for causing said fork to assume gathering position.

Figure 9 is a fragmentary side elevation illustrating a portion of a trip mechanism for automatically stopping the elevation of the fork as it nears the upper end of the track.

Figure 10 is a fragmentary side elevation illustrating a portion of the fork and a portion of the track supporting said fork and a trip mechanism for the dumping of the fork.

Figure 11 is a fragmentary vertical sectional view illustrating a combined clutch and brake for the control of the fork.

Figure 12 is a transverse sectional view taken on the line 12—12 of Figure 11.

Figure 13 is a fragmentary side elevation partly in section illustrating a takeup for the trip table.

Figure 14 is an end elevation illustrating the takeup.

Figure 15 is a fragmentary perspective view illustrating one of the trip arms and its operating means of the fork.

Figure 16 is a fragmentary perspective view illustrating the joint employed in the rails employed in the construction of the track.

Figure 17 is a fragmentary perspective view illustrating the upper end of one of the rails and a portion of the uppermost tying means or cathead employed for connecting the rails of the track at the upper end of the latter.

Referring in detail to the drawings, the numeral 5 indicates the main frame on which are mounted front and rear axles 6 and 7. The length of the front axle is much greater than the length of the rear axle and the latter-named axle is of the conventional steering type as indicated at 8 and has journaled thereon the rear wheels 9. The front axle 6 has journaled thereon the traction wheels 10. Supported by the frame 5 is an engine 11 of the internal combustion type equipped with the conventional clutch 12 for connecting and disconnecting the engine to a shaft 13 connected with a variable speed transmission 14. The drive shaft is indicated at 15 and is connected to the transmission 14 and to a differential 16 the live axles of which are indicated by the character 17 and parallel the front axle 6 and are suitably geared to the traction wheels 10.

A platform 18 is provided on the frame 5 forwardly of the engine and on which is mounted the operator's or driver's seat 19. A conventional steering mechanism 20 is supported by the platform in front of the seat 19 and is operatively connected with the steering mechanism of the rear wheels so that the driver can steer the device.

Mounted on the platform 18 is a clutch pedal 21 for the control of the clutch 12 the connection between these parts being of a conventional construction. Also mounted on the platform is a brake pedal 22 for the actuation of a brake 23 carried by the drive shaft 15 for braking the vehicle when necessary. The brake 23 consists of a brake drum 24 secured on the drive shaft 15 and engaged by a brake band 25 carried by supports 26 on the vehicle and is operatively connected to the brake pedal by a cable 27 passing over guide pulleys 28. The brake band 25 can be contracted onto the brake drum 24 for retarding the vehicle by pushing on the brake pedal 22. Thus it will be seen that the steering of this vehicle can be easily carried out by a person seated on the seat 19 and the person can conveniently control the brake 23 by the brake pedal 22 and control the clutch 12 by the clutch pedal 21.

Suitable braces 30 connect the rear axle to the rear end of the frame 5. A vertical track frame 31 is mounted on the forward end of the frame 5 and is of sectional construction so that the height thereof may be varied. The track frame 31 supports a vertically arranged track 32 also of sectional formation to match the sections of the frame 31 and includes track elements 33 each of tubular construction and suitably secured to the track frame and connected with each other by a cathead 34. Each rail or track element is of sections to match the sections of the frame and the sections have a telescopic type of joint 35, as shown in Figure 16, whereby the track elements or rails can be separated when desired. The sections of the track frame are strengthened by diagonally arranged braces 36 as well as horizontally arranged braces 37. Through the arrangement of the braces 36 and 37 the upper section of the frame may be removed from the lower section and as the track elements are sectional the upper section of said track elements may be removed along with the upper frame section. This construction permits the track frame and track carried thereby to be arranged at different heights for different types of work. The cathead 34 is in the form of a bar 38 provided with resilient clips 39 which may be inserted in the upper ends of the track elements with a frictional fit for detachably connecting the cathead on the track. When the upper section of the track is removed, the cathead may be applied to the lower section of the track. The cathead carries pulleys 40 over which are trained fork operating cables 41. The cables are secured and wound on drums 42 secured on a shaft 43 suitably supported for rotation on the frame 5. The shaft 43 is connected to a shaft 44 by gearing 45, this gearing being preferably in the form of a worm and worm gear, as shown in Figure 11. Arranged in alignment with the shaft 44 and suitably journaled on the frame 5 is a shaft 46 equipped with a sprocket gear 47 over which travels a sprocket chain 48. The sprocket chain is also trained over a sprocket gear secured on the shaft 13 so that whenever the clutch 12 is engaged the shaft 46 is operated by the engine.

A clutch 49 is employed for connecting and disconnecting the shafts 46 and 44 and includes clutch elements 50 and 51. The clutch element 50 is secured on the shaft 46 and the clutch element 51 is keyed on the shaft 44 for sliding movement into and out of engagement with the clutch element 50 through the operation of a control lever 52, the latter being pivotally mounted, as shown at 53.

A brake 54 is employed on the shaft 44 for controlling the rotation thereof and consists of a brake disc 55 pinned to the shaft 44 and a slidable brake disc 56 slidably mounted on the shaft 44 for coaction with the brake disc 55 and includes a sleeve 57 terminating adjacent the clutch element 51. The clutch element 51 may have a neutral position, that is, disengaged from the clutch element 50 and spaced from the sleeve 57 of the brake 54. The neutral position of the clutch element 51 will permit the shaft 44 to rotate freely under the load on the cables 41. However, when the control lever 52 is moved to the right in Figure 11, the brake disc 56 will be forced into engagement with the brake disc 55 and stop the rotation of the shaft 44. At this time the shaft 44 is declutched from the shaft 46. A movement of the control lever 52 to the left in Figure 11 brings about clutching of the shaft 46 to the shaft 44.

A fork 58 is mounted for travel on the track 32 and has a suitable carriage construction 59 on which the fork 58 is journaled. The carriage construction includes upper and lower pairs of rollers 60 and 61 engageable with opposite sides of the clutch elements. The mounting 59 of the fork has the cables 41 connected thereto so as to bring about raising and lowering of the fork on the vertical track. The fork 58 includes a plurality of tines 62 connected by a cross member 63 and journaled on a shaft 64 forming a part of the mounting 59. The cross member 63 forms a part of a shield or guard 65, the purpose of which is to prevent the hay on the fork from interfering with the carriage in its movement on the track. The tines of the fork are free to pivot on the mounting 59 and the cross member 63 is equipped with keepers 66 to be engaged by trip arms 67 pivotally mounted on the fork mounting 59 and are spring influenced to assume a position to engage said keepers when the tines of the fork are disposed horizontally or in hay-carrying position. The tines of the fork are provided with wedge-shaped blocks 62' and lie in close proximity to the shaft 64 so that the load on the tines may move freely over the shaft when the fork is gathering a load.

A trip shaft 68 is journaled on the mounting 59 and is provided with arms 69 connected to the trip arms by links 70. The trip shaft 68 also has a crank arm 71 to which a trip cable 72 is connected. The trip cable passes over a pulley 73 carried by an arm 74 of the mounting 59. The trip cable 72 extends to a cable take-up device 75 located on the platform of the main frame 5 so as to bring the trip cable in convenient reach of the operator. The cable take-up 75 is in the form of a grooved pulley 76 secured on a shaft 77 and the latter is journaled in supports 78 carried by the platform 18. The trip cable 72 is secured to and winds on the pulley and the shaft 77 has secured thereto a cable 79 which winds onto and off of the shaft and has connection with a coil spring 80 which tends to rotate the pulley 76 in one direction for the purpose of winding the trip cable 72 thereon so that slack which may occur in the trip cable due to the raising of the fork will be automatically taken up. However, it is to be understood that the tension of the spring 80 is not sufficient to exert a pull on the trip cable 72 that would bring about actuation of the trip arms of the fork, requiring a manual pull on the trip cable 72 before the trip arms 67 would be disengaged from the keepers 66, allowing the fork 58 to assume dumping position. A comparatively light tension spring 81 acts on the fork to urge the latter into load carrying position when free of a load. However, when the fork is under load and the trip arms 67 are disengaged from the keepers the load overcomes the strength of the spring 81 and the fork assumes dumping position.

A trip member 82 is slidably mounted on the track adjacent the upper end thereof to be engaged by one of the upper rollers of the fork as the latter nears the upper end of the track and is connected to the control lever 52 of the clutch 49 by a cable 83. This arrangement will bring about automatic stopping of the upward movement of the fork when the latter reaches a position near the upper end of the track by declutching the shaft 46 from the shaft 44 and at the same time applying the brake 54 to the shaft 44 to maintain the fork in its elevated position.

Of course, it is to be understood that the fork may be manually stopped at any position on the track through the operation of the control lever 52.

The lower ends of the track elements are offset to form pockets 84 in which the lower rollers 61 of the fork may move when said fork reaches its lowermost position for the purpose of providing a limited tilting of the fork downwardly so that the free ends of the tines come in close proximity to the surface of the ground and which permits the tines to readily gather up hay off of the ground for accumulation on the fork.

In operation, it is to be understood that this device under manual control is steered over acreage which has been mowed for the purpose of gathering onto the fork when in its lowermost position hay or other growth. After the fork has become full, the operator, through the control lever 52, elevates the fork to a desired height by power derived from the engine. The elevation of this fork may be carried out either when the vehicle is in motion or standing still. The load of hay on the fork then can be carried by the device in entirety to a selected place and the driver or operator on reaching the selected place pulls the trip guards which releases the fork and allows the same to dump. As the load leaves the fork the latter assumes a load-carrying position under the influence of the spring 81 and the latch arms 67 move into engagement with the keepers 66 by the action of the springs connected thereto. The fork is then ready to be lowered which is entirely under the control of the operator through the use of the control lever 52. The fork on being brought to a lowered position may again gather hay as before described. Through the arrangement of the trip element 82 connected with the control lever 52 by the cable 83 the clutch 49 will be automatically declutched to stop the elevation of the fork when the latter reaches its uppermost position on the track thereby eliminating manual attention of stopping the elevation of the fork if it is desired that the fork reach a full elevated position.

Thus it will be seen that a device of this kind is extremely easy to manipulate and only requires the attention of a single operator and will efficiently gather hay and elevate the gathered hay to a selected height and dump the hay at a selected place when desired. It is to be understood that in operating this device under certain conditions it may be necessary to shorten the track and its supporting frame so that the device may clear obstructions and if it is desired that the device be used with a shortened track it is to be understood that the cables which operate the fork are also shortened as well as the trip cable.

Tie cables 84' connect the cathead with the frame 5.

It is believed that the foregoing description, when taken in connection with the drawings, will fully set forth the construction and advantages of this invention to those skilled in the art to which such a device relates, so that further detailed description will not be required.

Having thus described the invention, what I claim is:

1. In a device of the character described, a vehicle including a power means for the propulsion thereof and steering means and control means for the stopping and starting of said vehicle, a sectional vertically arranged frame at the forward end of the vehicle, a sectional track carried by said frame, a fork mounting slidably mounted on the track, a fork pivotally mounted on said mounting, trip means for releasably sustaining the fork in operative position, a power transmission device on the vehicle and driven by said power source and including a clutch and brake having a control lever, drums driven by said power transmission device, cables secured to and wound on said drum, a cathead on the frame, pulleys carried by the cathead and having the cables trained thereover, said cables connected to the fork mounting, a trip cable connected to the trip mechanism and extending to the vehicle and movable with the fork, a cable takeup on the vehicle and having the trip cable connected thereto for relieving the latter of slack at all times.

2. In a device of the character described, a vehicle including a power means for the propulsion thereof and steering means and control means for the stopping and starting of said vehicle, a sectional vertically arranged frame at the forward end of the vehicle, a sectional track carried by said frame, a fork mounting slidably mounted on the track, a fork pivotally mounted on said mounting, trip means for releasably sustaining the fork in operative position, a power transmission device on the vehicle and driven by said power source and including a clutch and brake having a control lever, drums driven by said power transmission device, cables secured to and wound on said drum, a cathead on the frame, pulleys carried by the cathead and having the cables trained thereover, said cables connected to the fork mounting, a trip cable connected to the trip mechanism and extending to the vehicle and movable with the fork, a cable takeup on the vehicle and having the trip cable connected thereto for relieving the latter of slack at all times, and a brake mechanism connected with the power transmission device for sustaining the fork in any of its adjusted positions.

OTTO UFEN.